United States Patent [19]  [11]  4,197,120
Wright et al.  [45]  Apr. 8, 1980

[54] ELECTROPHORETIC MIGRATION IMAGING PROCESS

[75] Inventors: Hal E. Wright; Joseph Y. Kaukeinen, both of Rochester, N.Y.

[73] Assignee: Eastman Kodak Company, Rochester, N.Y.

[21] Appl. No.: 764,680

[22] Filed: Feb. 2, 1977

Related U.S. Application Data

[63] Continuation-in-part of Ser. No. 645,005, Dec. 29, 1975, abandoned.

[51] Int. Cl.² ............... G03G 13/01; G03G 17/04
[52] U.S. Cl. .................................. 430/32; 430/41; 430/42
[58] Field of Search ............ 96/1 PE, 1.5, 1.2; 260/240 TC; 204/181 RE

[56] References Cited

U.S. PATENT DOCUMENTS

| | | | |
|---|---|---|---|
| 3,384,565 | 5/1968 | Tulagin et al. | 96/1 PE |
| 3,681,068 | 8/1972 | Johnson | 96/1.6 |
| 3,933,664 | 1/1976 | Nagashima et al. | 96/1 PE |
| 4,012,376 | 3/1977 | Wright | 96/1.5 |

Primary Examiner—Roland E. Martin, Jr.
Assistant Examiner—John L. Goodrow
Attorney, Agent, or Firm—John R. Everett

[57] ABSTRACT

An improved electrophoretic migration imaging process is disclosed wherein the improvement comprises the use of electrically photosensitive particles containing a colorant having an absorption maximum greater than about 410 nm. and having the formula:

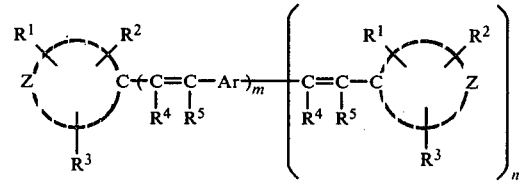

wherein n represents 0 or 1; m represents 1 or 2; Ar represents an aromatic group; Z represents the nonmetallic atoms to complete an aromatic group; and each of $R^1$, $R^2$, $R^3$, $R^4$ and $R^5$ represents hydrogen, nitro, cyano, halogen, or one of various specified organo groups.

10 Claims, 1 Drawing Figure

ELECTROPHORETIC MIGRATION IMAGING PROCESS

This application is a Continuation in Part of our U.S. Pat. application No. 645,005 filed Dec. 29, 1975 in the name of Kaukeinen and Wright now abandoned.

FIELD OF THE INVENTION

This invention relates to electrophoretic migration imaging processes and, in particular, to the use of certain photosensitive pigment materials in such processes.

BACKGROUND OF THE INVENTION

In the past, there has been extensive description in the patent and other technical literature of electrophoretic migration imaging processes. For example, a description of such processes may be found in U.S. Pat. Nos. 2,758,939 by Sugarman issued Aug. 14, 1956; 2,940,847, 3,100,426, 3,140,175 and 3,143,508, all by Kaprelian; 3,384,565, 3,384,488 and 3,615,558, all by Tulagin et al; 3,384,566 by Clark; and 3,383,993 by Yeh. In addition to the foregoing patent literature directed to conventional photoelectrophoretic migration imaging processes, another type of electrophoretic migration imaging process which advantageously provides for image reversal is described in Groner, U.S. Pat. No. 3,976,485 issued Aug. 24, 1976.

Certain important differences exist between the specific electrophoretic migration imaging processes described, for example, in the above-noted patents to Sugarman, Kaprelian, Tulagin et al, Clark and Yeh, all of which deal with conventional electrophoretic migration imaging processes, and the above-noted Groner U.S. patent. The Groner application describes a novel method and apparatus for obtaining image reversal as a consequence of the electrical interaction between unexposed photosensitive particles and a "dark charge exchange" electrode quite different from that which occurs in conventional electrophoretic migration imaging processes. However, there are certain general points of similarity existing in each of the electrophoretic migration imaging processes described in the foregoing patents.

In general, each of the foregoing electrophoretic migration imaging processes typically employs a layer of electrostatic charge-bearing photoconductive particles, i.e., electrically photosensitive particles, positioned between two spaced electrodes, one of which may be transparent. To achieve image formation in these processes, the charge-bearing photosensitive particles positioned between the two spaced electrodes, as described above, are subjected to the influence of an electric field and exposed to activating radiation. As a result, the charge-bearing electrically photosensitive particles are caused to migrate electrophoretically to the surface of one or the other of the spaced electrodes, and one obtains an image pattern on the surface of these electrodes. Typically, a negative image is formed on one electrode, and a positive image is formed on the opposite electrode. Image discrimination occurs in the various electrophoretic migration imaging processes as a result of a net change in charge polarity of either the exposed electrically photosensitive particles (in the case of conventional electrophoretic migration imaging) or the unexposed electrically photosensitive particles (in the case of the electrophoretic migration imaging process described in the above-noted Groner patent application) so that the image formed on one electrode surface is composed ideally of electrically photosensitive particles of one charge polarity, either negative or positive polarity, and the image formed on the opposite polarity electrode surface is composed ideally of electrically photosensitive particles having the opposite charge polarity, either positive or negative.

In any case, regardless of the particular electrophoretic migration imaging process employed, it is apparent that an essential component of any such process is the electrically photosensitive particles. And, of course, to obtain an easy-to-read, visible image it is important that these electrically photosensitive particles be colored, as well as electrically photosensitive. Accordingly, as is apparent from the technical literature regarding electrophoretic migration imaging processes, work has been carried on in the past and is continuing to find particles which possess both useful levels of electrical photosensitivity and which exhibit good colorant properties. Thus, for example, various types of electrically photosensitive materials are disclosed for use in electrophoretic migration imaging processes, for example, in U.S. Pat. Nos. 2,758,939 by Sugarman, 2,940,847 by Kaprelian, and 3,384,488 and 3,615,558 by Tulagin et al, noted hereinabove.

In large part, the art, to date, has generally selected useful electrically photosensitive or photoconductive pigment materials for electrophoretic migration imaging from known classes of photoconductive materials which may be employed in conventional photoconductive element, e.g., photoconductive plates, drums, or webs used in electrophotographic office-copier devices. For example, both Sugarman and Kaprelian in the above-referenced patents state that electrically photosensitive materials useful in electrophoretic migration imaging processes may be selected from known classes of photoconductive materials. And, the phthalocyanine pigments described as a useful electrically photosensitive material for electrophoretic imaging processes in U.S. Pat. No. 3,615,558 by Tulagin et al have long been known to exhibit useful photoconductive properties.

It is recognized, as set forth above, that many useful electrically photosensitive materials which are employed in electrophoretic migration imaging processes can be and have been selected from known photoconductive materials. However, in accord with the present invention it has unexpectedly been found after extensive investigation of one particular class of known photoconductive materials including, but not limited to, those materials described in U.S. Pat. No. 3,246,983 issued Apr. 19, 1966, 3,567,450 issued Mar. 2, 1971, 3,653,887 issued Apr. 4, 1972, and 3,873,312 issued Mar. 25, 1975, that a particular subclass of these materials within the larger class of organic photoconductive materials exemplified by the above-noted patents are highly useful in electrophoretic migration imaging processes as electrophotosensitive materials and/or as chemical sensitizers for other electrophotosensitive materials whereas many closely related materials within this same class of known organic photoconductive materials show little or no utility in electrophoretic migration imaging processes.

SUMMARY OF THE INVENTION

In accord with the present invention, it has been discovered that electrostatic charge-bearing particles comprising an electrically photosensitive colorant material having an absorption maximum to visible light greater than about 410 nm. and having the following formula are particularly suitable for use in electrophoretic migration imaging processes:

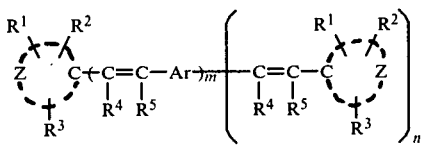

wherein:

n represents 0 or 1;

m represents the integer 1 or 2;

Ar represents a substituted or unsubstituted, carbocyclic or heterocyclic aromatic ring group, preferably having 6 to about 20 ring atoms in the aromatic ring, e.g., phenyl, naphthyl, anthryl, etc.;

Z represents the nonmetallic atoms necessary to complete a carbocyclic or heterocyclic aromatic ring group, preferably having 5 to about 14 ring atoms in the aromatic ring, e.g., phenyl, anthryl, carbazole, pyrrole, etc.;

each of $R^1$, $R^2$, $R^3$, $R^4$ and $R^5$, which may be the same or different, when taken alone, represent hydrogen, nitro, cyano, halogen, an alkoxy having 1 to 8 carbon atoms, a saturated heterocyclic amino having 5 to 8 ring atoms; a dialkylamino, diarylamino, dialkarylamino, or diaralkylamino wherein the alkyl group contained in such amino is a substituted or unsubstituted alkyl having 1 to 8 carbon atoms in the alkyl; a substituted or unsubstituted alkyl having 1 to 8 carbon atoms in the alkyl; a substituted or unsubstituted, carbocyclic or heterocyclic aromatic ring group having 5 to 14 carbon atoms in the aromatic ring, a carboxy ester having 1 to 4 carbon atoms, or an amide having the formula $$-CONR^6_2$$

wherein $R^6$ represents hydrogen or a substituted or unsubstituted aromatic group or a substituted or unsubstituted alkyl as defined above;

each of $R^1$, $R^2$ and $R^3$, when taken together, represent, together with Z, the atoms necessary to complete a fused, polynuclear carbocyclic or heterocyclic aromatic ring group, preferably an aromatic ring group having 10 to 14 carbon atoms, so that each of $R^1$, $R^2$ and $R^3$, when taken together, are free from any saturated N-heterocyclic ring group fused to the aromatic ring formed by Z;

with the proviso that (i) when m represents 1 and n represents 0, Ar represents phenylene, and more than one of $R^4$, $R^5$, and the substituents on Ar represent either nitro or cyano, then at least one of $R^1$, $R^2$ or $R^3$ represents diarylamino or dialkarylamino.

A variety of different substituents may be present in the above-defined formula in the case where Ar represents a substituted aromatic group. In general, the substituents on Ar may be selected from the same class of substituent groups defined above for $R^1$, $R^2$, $R^3$, $R^4$ and $R^5$.

When used in an electrophoretic migration imaging process, the charge-bearing, electrically photosensitive particles of the present invention are positioned between two spaced electrodes; preferably these particles are contained in an electrically insulating carrier such as an electrically insulating liquid or an electrically insulating, liquefiable matrix material, e.g., a thixotropic or a heat- and/or solvent-softenable material, which is positioned between the spaced electrodes. While so positioned between the spaced electrodes, the photosensitive particles used in the invention are subjected to an electric field and exposed to a pattern of activating radiation. As a consequence, the charge-bearing, electrically photosensitive particles undergo a radiation-induced variation in their charge polarity and migrate to one or the other of the electrode surfaces to form on at least one of these electrodes an image pattern representing a positive-sense or negative-sense image of the original radiation exposure pattern.

DESCRIPTION OF THE PREFERRED EMBODIMENTS

Figure 1:
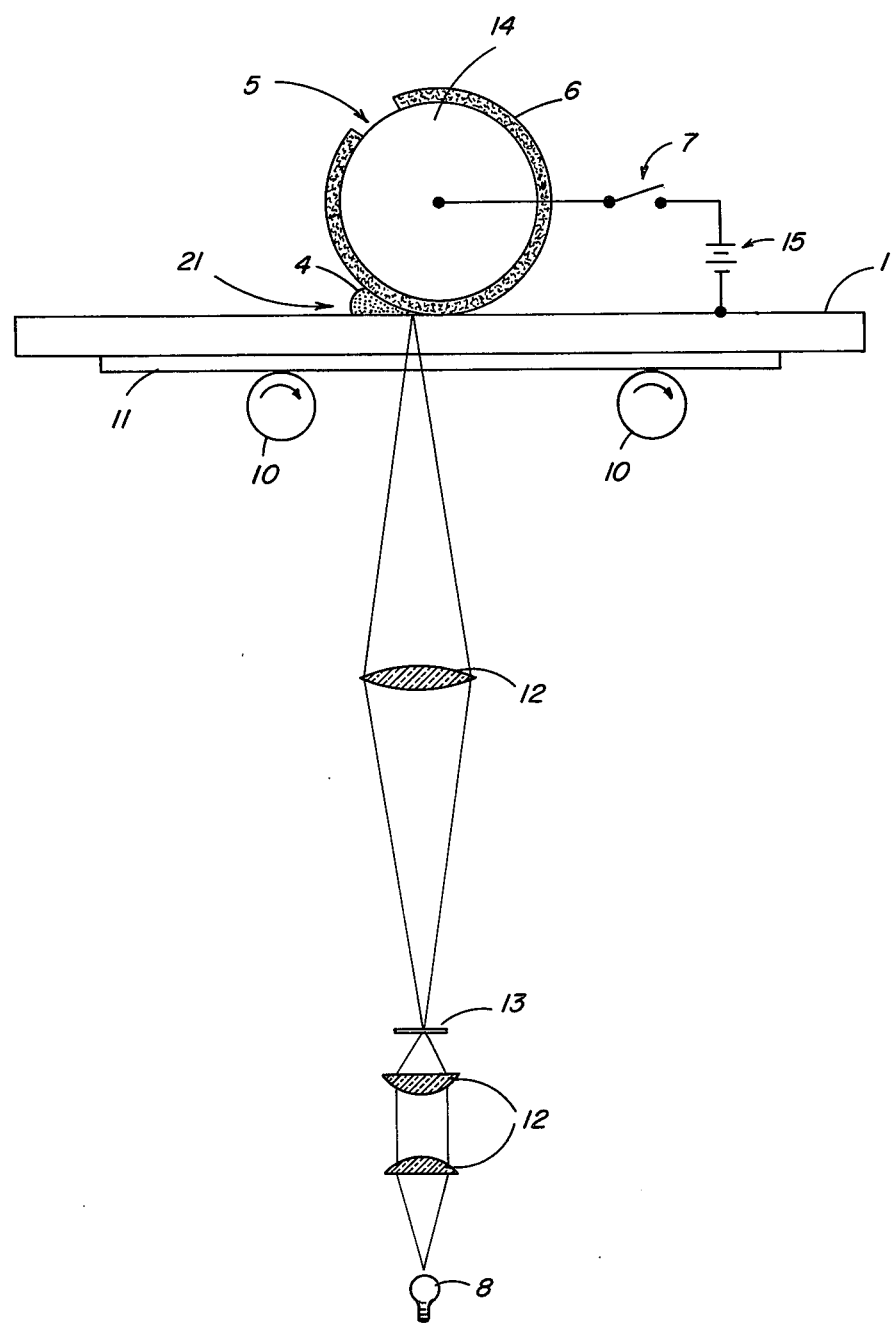
FIG. 1 represents diagrammatically a typical imaging apparatus for carrying out the electrophoretic migration imaging process of the invention.

As noted hereinabove, many of the photosensitive materials which have been found useful in the electrically photosensitive particles used in the electrophoretic migration imaging processes of the present invention have previously been found to possess useful levels of photoconductivity. For example, U.S. Pat. Nos. 3,246,983, 3,567,450, 3,653,887 and 3,873,312 teach that certain of the specific materials, which are described herein as useful in the preparation of electrically photosensitive particles for electrophoretic migration imaging processes, have previously been identified as useful photoconductors. However, it has unexpectedly been found that, while certain of the materials described as photoconductors in U.S. Pat. Nos. 3,246,983, 3,567,450, 3,653,887 and 3,873,312 do provide useful electrically photosensitive material for use in electrophoretic migration imaging processes, many other quite similar photoconductive materials described in these same patents have little or no utility in electrophoretic migration imaging processes.

It is also to be noted that surprisingly that many of the electrically photosensitive materials of the present invention as described by formula I, are also useful as chemical sensitizers of electrophotosensitive materials. Hence, the materials described by formula I of the present invention may be used in electrophoretic migration imaging processes as (1) an electrophotosensitive material and/or chemical sensitizer in the formation of monochrome images, (2) as a chemical sensitizer of other electrophotosensitive material in the formation of monochrome images and/or (3) as an electrophotosensitive material and/or a chemical sensitizer in the formation of polychrome images. It will be understood that in a mixture comprising a material described by formula I and at least one other electrophotosensitive material, the formula I material may act as both an electrophotosensitive material and a chemical sensitizer.

Accordingly, as will be apparent upon comparing structural formula I above with the materials disclosed in U.S. Pat. Nos. 3,246,983, 3,567,450, 3,653,887 and 3,873,312, it can be seen that structural formula I includes certain materials as useful materials in electrophoretic migration imaging processes which are not disclosed in either of the two aforementioned patents, and also that structural formula I excludes many materials which are disclosed as useful photoconductors in these same patents. In brief, for reasons not fully understood by applicants, it has been found that materials having structural formula I hereinabove provide highly useful electrophotosensitive materials and/or chemical sensitizers for other electrically photosensitive materials for electrophoretic migration imaging processes, whereas materials which may have structural formulas quite similar to that shown in formula I and which are known to possess useful photoconductive properties do not serve as useful materials for electrophoretic migration imaging processes.

In addition to the unexpected capability as sensitizers and the unexpected useful levels of electrophotosensitivity exhibited by the materials of formula I above in electrophoretic migration imaging processes, in comparison with that exhibited by similar organic photoconductive materials, the materials of formula I generally exhibit certain other properties which make these materials quite useful in electrophoretic migration imaging processes. Among other such useful properties, the materials of formula I are typically highly colored materials, generally exhibiting an absorption maxima to visible light at a wavelength greater than 410 nm, preferably in the 420 to 600 nm region of the visible spectrum. Thus, these materials, in general, tend to have a yellow, orange, or magenta hue. In contrast, many, although not all, of the organic photoconductive materials described in U.S. Pat. Nos. 3,246,983 and 3,567,450 are colorless materials. Also, whereas many of the organic photoconductive materials described in U.S. Pat. No. 3,246,983, 3,567,450, 3,653,887 and 3,873,312 are soluble in conventional organic solvents, e.g., aliphatic hydrocarbon solvents such as Isopar G ® or alkylated aromatic solvents such as Solvesso 100, and therefore can readily be coated or cast, together with a binder, from conventional organic solvents onto a conductive support to form photoconductive plates, webs, drums and the like useful in conventional electrophotographic applications, the materials of formula I tend to be highly insoluble or only slightly soluble in such conventional organic solvents. This latter property of substantial insolubility in conventional organic solvents is advantageous in electrophoretic migration imaging processes, particularly in those embodiments of such processes wherein the electrically photosensitive material is dispersed in particulate form in an electrically insulating carrier such as a conventional aliphatic hydrocarbon liquid to form an electrophoretic migration imaging suspension.

Typical electrically photosensitive colorant materials which may be used in the present invention have the formula I illustrated hereinabove.

The terms "substituted alkyl group" and "substituted aromatic ring group" as used in the present application are defined to means those substituents which do not interfere with the electrical photosensitivity of the colorants used in the invention and which are conventionally recognized in the art as typical substituents for alkyl and aromatic groups, respectively. A partial listing of representative such substituted alkyl groups includes the following materials. Typically, these materials contain 1 to about 8 carbon atoms in the alkyl group thereof.

a. alkoxyalkyl having a total of 2 to about 8 carbon atoms, e.g., ethoxypropyl, methoxybutyl, propoxymethyl, etc.
b. aryloxyalkyl, e.g., phenoxyethyl, naphthoxymethyl, phenoxypentyl, etc.,
c. aminoalkyl, e.g., aminobutyl, aminoethyl, aminopropyl, etc.
d. hydroxyalkyl, e.g., hydroxypropyl, hydroxyoctyl, hydroxymethyl, etc.,
e. aralkyl, e.g., benzyl, phenethyl, ω,ω-diphenylalkyl, etc.,
f. alkylaminoalkyl, e.g., methylaminopropyl, methylaminoethyl, etc., and also including dialkylaminoalkyl, e.g., diethylaminoethyl, dimethylaminopropyl, propylaminooctyl, etc.,
g. arylaminoalkyl, e.g., phenylaminoalkyl, diphenylaminoalkyl, N-phenyl-N-ethylaminopentyl, N-phenyl-N-ethylaminohexyl, naphthylaminomethyl, etc.,
h. nitroalkyl, e.g., nitrobutyl, nitroethyl, nitropentyl, etc.,
i. cyanoalkyl, e.g., cyanopropyl, cyanobutyl, cyanoethyl, etc.,
j. haloalkyl, e.g., chloromethyl, bromopentyl, chlorooctyl, etc., and,
k. alkyl substituted with an acyl group having the formula:

wherein R is hydroxy, hydrogen, aryl, e.g., phenyl, naphthyl, etc., lower alkyl having 1 to about 4 carbon atoms, e.g., methyl, ethyl, propyl, etc., amino including substituted amino, e.g., diloweralkylamino, lower alkoxy having 1 to about 8 carbon atoms, e.g., butoxy, methoxy, etc., aryloxy, e.g., phenoxy, naphthoxy, etc.

A partial listing of representative substituted aromatic ring groups includes the following materials. Typically, the substituent groups on these aromatic materials contain from 1 to about 8 carbon atoms.

a. alkoxyaryl, e.g., ethoxyphenyl, methoxyphenyl, propoxynaphthyl, etc.,
b. aryloxyaryl, e.g., phenoxyphenyl, naphthoxyphenyl, phenoxynaphthyl, etc.,
c. aminoaryl, e.g., aminophenyl, aminonaphthyl, aminoanthryl, etc.,
d. hydroxyaryl, e.g., hydroxyphenyl, hydroxynaphthyl, hydroxyanthryl, etc.,
e. biphenylyl,
f. alkylaminoaryl, e.g., methylaminophenyl, methylaminonaphthyl, etc., and also including dialkylaminoaryl, e.g., diethylaminophenyl, dipropylaminophenyl, etc.,
g. arylaminoaryl, e.g., phenylaminophenyl, diphenylaminophenyl, N-phenyl-N-ethylaminophenyl, naphthylaminophenyl, etc.,
h. nitroaryl, e.g., nitrophenyl, nitronaphthyl, nitroanthryl, etc.,
i. cyanoaryl, e.g., cyanophenyl, cyanonaphthyl, cyanoanthryl, etc.,
j. haloaryl, e.g., chlorophenyl, bromophenyl, chloronaphthyl, etc.,
k. alkaryl, e.g., tolyl, ethylphenyl, propylnaphthyl, etc., and
l. aryl substituted with an acyl group having the formula:

wherein R is hydroxy, hydrogen, lower alkyl having 1 to about 4 carbon atoms, e.g., methyl, ethyl, propyl, butyl, etc., aryl, e.g., phenyl, naphthyl, etc., amino including substituted amino, e.g., diloweralkylamino, lower alkoxy having 1 to about 8 carbon atoms, e.g., butoxy, methoxy, etc., aryloxy, e.g., phenoxy, naphthoxy, etc.

Within the class of materials having formula I above, three individual subclasses of materials have been found to exhibit particularly useful properties for electrophoretic migration imaging processes. These three subclasses of materials may be represented by the following structural formulas:

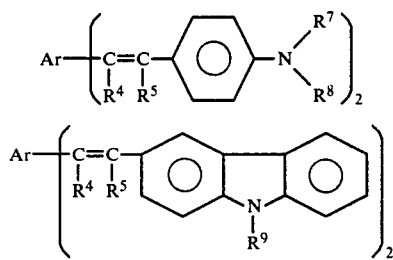

wherein Ar is as defined hereinabove; each of $R^4$ and $R^5$, which may be the same or different, represents hydrogen or a cyano group; and each of $R^7$, $R^8$, $R^9$, $R^{10}$ and $R^{11}$, when taken alone, represents a substituted or unsubstituted, acyclic lower alkyl having 1 to about 8 carbon atoms or a substituted or unsubstituted, carbocyclic aromatic ring group preferably having 6 to about 14 ring atoms in the aromatic ring, such as an aryl group, e.g., phenyl, or an alkaryl, e.g., tolyl, ethylphenyl, etc., and $R^7$ and $R^8$, when taken together, represent a pyrrolidinyl or a piperidino group.

In general, the photosensitive materials of formula I above which have, to date, been found most useful in the present invention because of their high degree of photosensitivity and other desirable properties, for example, color separation in multicolor electrophoretic migration imaging processes and the like, tend to exhibit a yellow or orange coloration and a maximum absorption wavelength, λmax, within the range of from about 420 to about 600 nm. Although photosensitive materials represented by formulas II–IV above have generally been found most useful among the various materials described within the general class having formula I, a variety of different materials within the class defined by formula I have been tested and found to exhibit useful levels of electrical photosensitivity in electrophoretic migration imaging processes. A partial listing of representative such materials is included herein in Table 1.

Table 1

| Compound No. | Compound Structure |
| --- | --- |
| 1 | $(C_2H_5)_2N$—⟨○⟩—CH=CH—⟨○○⟩—CH=CH—⟨○⟩—$N(C_2H_5)_2$ |
| 2 | $(C_2H_5)_2N$—⟨○⟩—CH=CH—⟨○⟩—CH=CH—⟨○⟩—$N(C_2H_5)_2$ |
| 3 | $(CH_3$—⟨○⟩$)_2N$—⟨○⟩—CH=CH—⟨○○⟩—CH=CH—⟨○⟩—$N($—⟨○⟩—$CH_3)_2$ |

Table 1-continued
| Compound No. | Compound Structure |
|---|---|
| 4 | 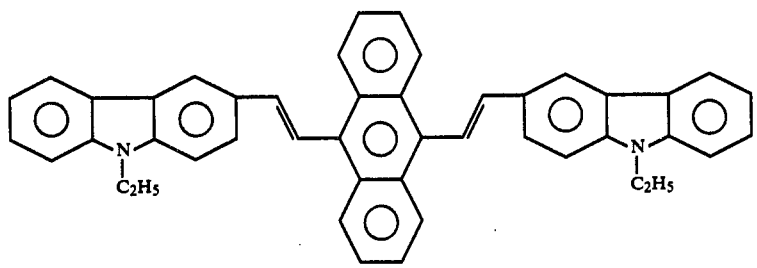 |
| 5 | 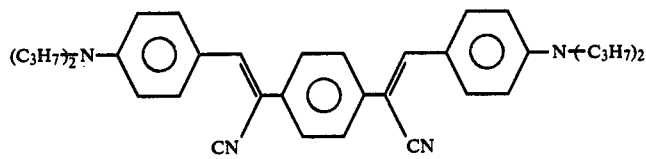 |
| 6 | 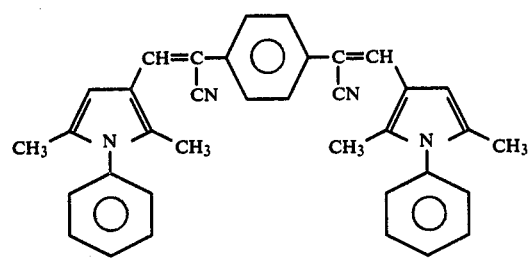 |
| 7 | 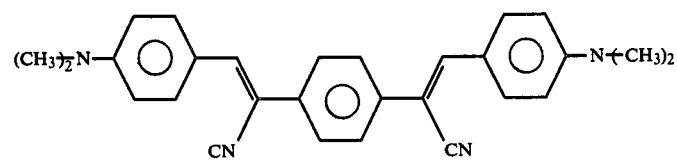 |
| 8 | 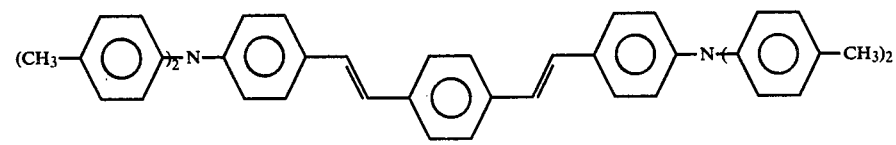 |
| 9 | 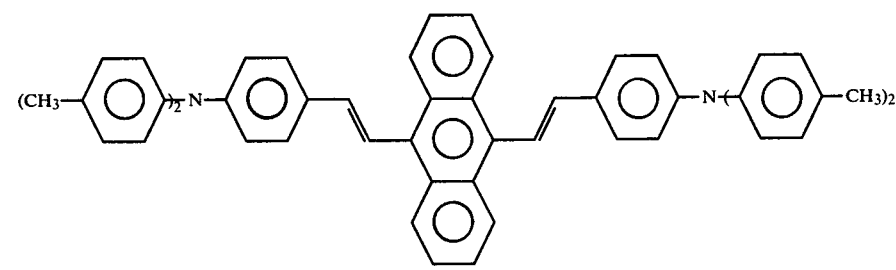 |
| 10 | 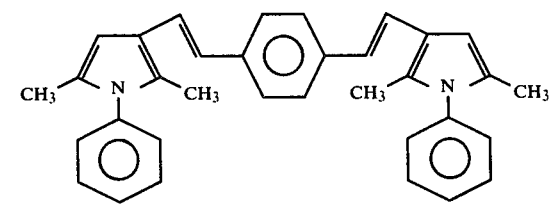 |

Table 1-continued
| Compound No. | Compound Structure |
|---|---|
| 11 | 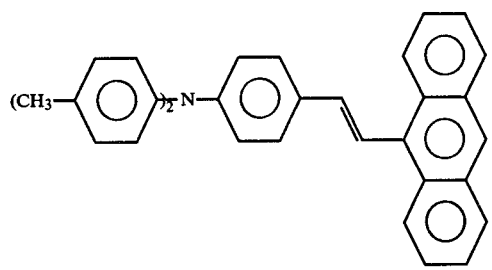 |
| 12 | 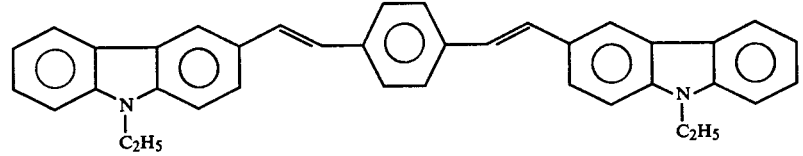 |
| 13 | 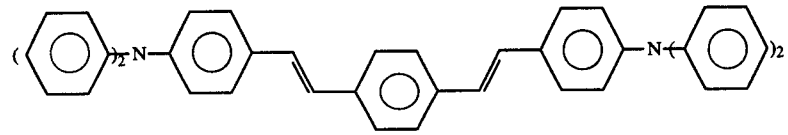 |
| 14 | 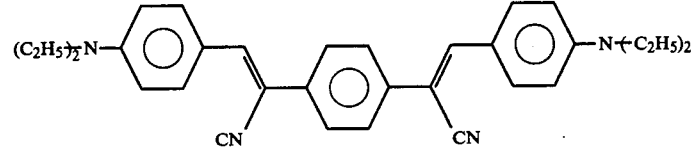 |
| 15 | 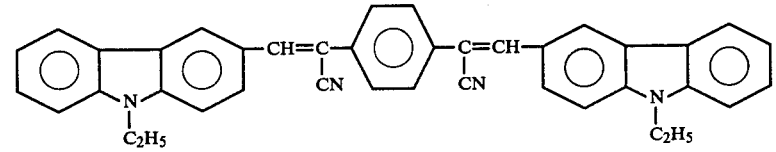 |
| 16 | 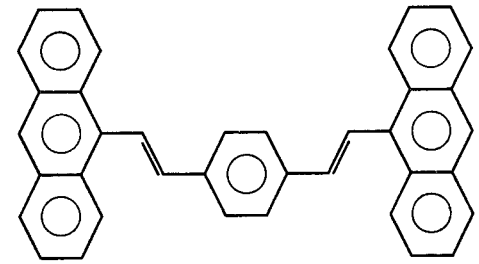 |
| 17 | 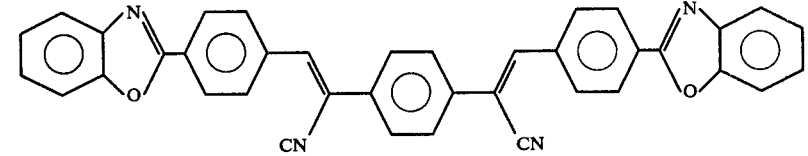 |
| 18 | 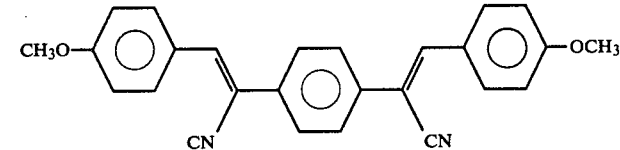 |

4,197,120
Table 1-continued
| Compound No. | Compound Structure |
|---|---|
| 19 | 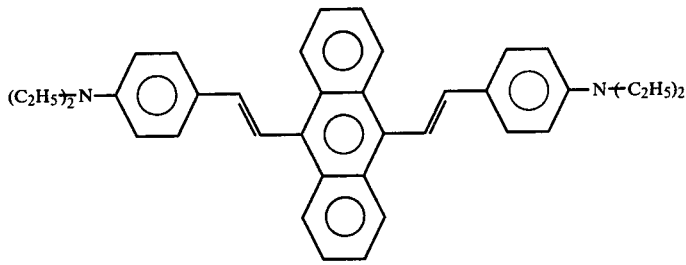 |
| 20 | 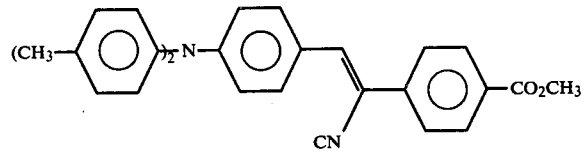 |
| 21 | 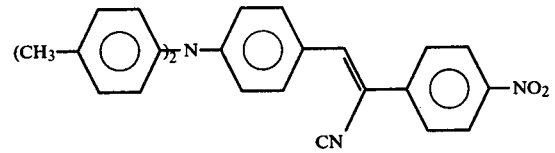 |
| 22 | 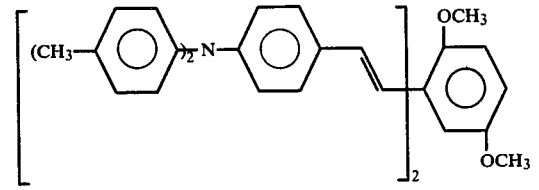 |
| 23 | 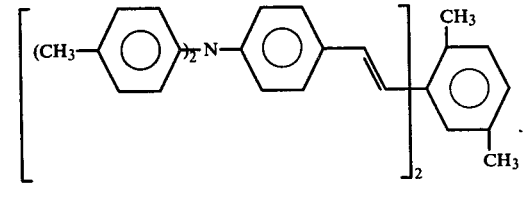 |
| 24 | 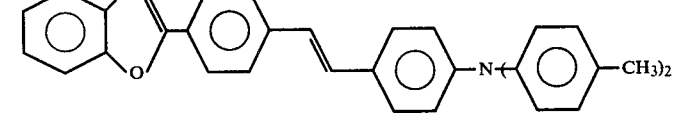 |
| 25 | 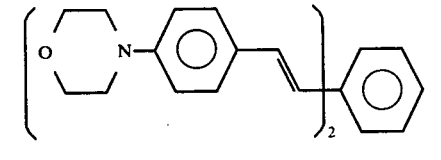 |
| 26 | 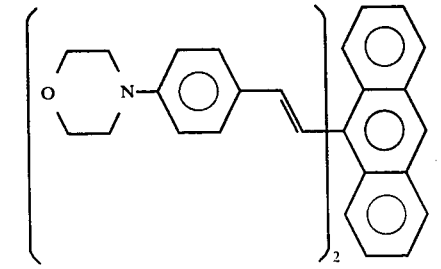 |

Table 1-continued
| Compound No. | Compound Structure |
|---|---|
| 27 | 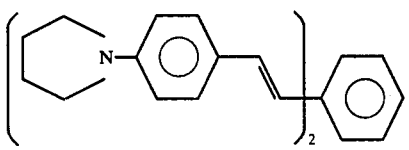 |
| 28 | 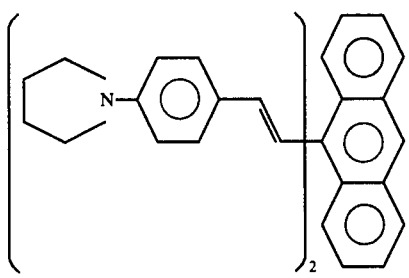 |
| 29 | 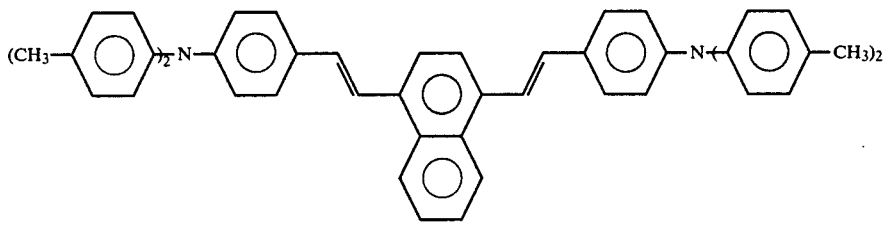 |
| 30 | 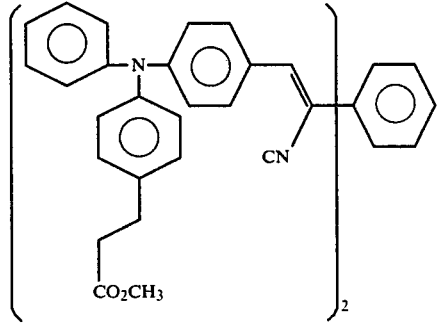 |
| 31 | 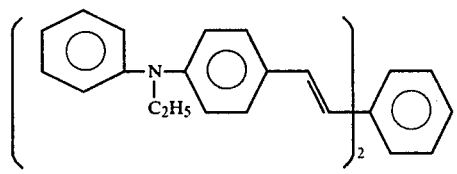 |
| 32 | 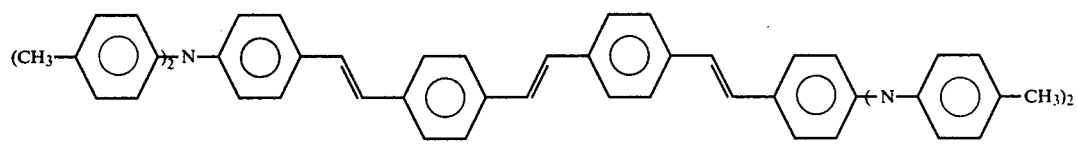 |
| 32a | 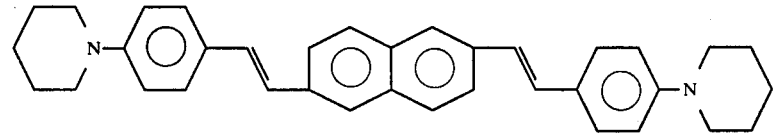 |

Table 1-continued

| Compound No. | Compound Structure |
| --- | --- |
| 32b | (CH$_3$)$_2$—N—⟨phenyl⟩—CH=CH—⟨anthracene⟩—CH=CH—⟨phenyl⟩—N(CH$_3$)$_2$ |
| 33 | (CH$_3$)$_2$N—⟨phenyl⟩—CH=CH—⟨phenyl⟩—CH=CH—⟨phenyl⟩—N(CH$_3$)$_2$ |

As indicated hereinabove, the electrically photosensitive colorant material described herein is useful in the preparation of electrically photosensitive imaging particles of electrophoretic migration imaging processes. In general, electrically photosensitive particles useful in such processes have an average particle size within the range of from about 0.01 micron to about 20 microns, preferably from about 0.01 to about 5 microns. Typically, these particles are composed of one or more colorant materials such as those described in the present invention. However, these electrically photosensitive particles may also contain various nonphotosensitive materials such as electrically insulating polymers, charge control agents, various organic and inorganic fillers, as well as various additional dyes or pigment materials to change or enhance various colorant and physical properties of the electrically photosensitive particle. In addition, such electrically photosensitive particles may contain other photosensitive materials such as various sensitizing dyes and/or chemical sensitizers to alter or enhance their response characteristics to activating radiation.

Also as stated hereinabove, the materials described by formulas I-V, are useful as chemical sensitizers for electrophotosensitive particles used in electrophoretic migration imaging processes and/or as electrophotosensitive materials in electrophoretic migration imaging processes. When used in an electrophoretic migration imaging process in accord with the present invention, the electrically photosensitive material described by formulas I-V hereinabove, whether used for the electrophotosensitive properties or as chemical sensitizers are typically positioned in particulate form, between two or more spaced electrodes, one or both of which typically being transparent to radiation to which the electrically photosensitive material is light-sensitive, i.e., activating radiation. Although the electrically photosensitive material, in particulate form, may be dispersed simply as a dry powder between two spaced electrodes and then subjected to a typical electrophoretic migration imaging operation such as that described in U.S. Pat. No. 2,758,939 by Sugarman referenced hereinabove, it is more typical to disperse the electrically photosensitive particulate material in an electrically insulating carrier, such as an electrically insulating liquid, or an electrically insulating, liquefiable matrix material, such as a heat- and/or solvent-softenable polymeric material or a thixotropic polymeric material. Typically, when one employs such a dispersion of electrically photosensitive particulate material and electrically insulating carrier material between the spaced electrodes of an electrophoretic migration imaging system, it is conventional to employ from about 0.05 part to about 2.0 parts of electrically photosensitive particulate material for each 10 parts by weight of electrically insulating carrier material.

As indicated above, when the electrically photosensitive particles used in the present invention are dispersed in an electrically insulating carrier material, such carrier material may assume a variety of physical forms and may be selected from a variety of different materials. For example, the carrier material may be a matrix of an electrically insulating, normally solid polymeric material capable of being softened or liquefied upon application of heat, solvent, and/or pressure so that the electrically photosensitive particulate material dispersed therein can migrate through the matrix. In another, more typical embodiment of the invention, the carrier material can comprise an electrically insulating liquid such as decane, paraffin, Sohio Oderless Solvent 3440 (a kerosene fraction marketed by the Standard Oil Company, Ohio), various isoparaffinic hydrocarbon liquids such as those sold under the trademark Isopar G by Exxon Corporation and having a boiling point in the range of 145° C. to 186° C., various halogenated hydrocarbons such as carbon tetrachloride, trichloromonofluoromethane, and the like, various alkylated aromatic hydrocarbon liquids such as the alkylated benzenes, for example, xylenes, and other alkylated aromatic hydrocarbons such as are described in U.S. Pat. No. 2,899,335. An example of one such useful alkylated aromatic hydrocarbon liquid which is commercially available is Solvesso 100 made by Exxon Corp. Solvesso 100 has a boiling point in the range of about 157° C. to about 177° C. and is composed of 9 percent xylene, 16 percent of other monoalkyl benzenes, 34 percent dialkyl benzenes, 37 percent trialkyl benzenes, and 4 percent aliphatics. Typically, whether solid or liquid at normal room temperatures, i.e., about 22° C., the electrically insulating carrier material used in the present invention is a material having a resistivity greater than about $10^9$ ohm-cms, preferably greater than about $10^{12}$ ohm-cm. When the electrically photosensitive particles used in the present invention are incorporated in a carrier material, such as one of the above-described electrically insulating liquids, various other addenda may also be incorporated in the resultant imaging suspension. For example, various charge control agents may be incorporated in such a suspension to improve the uniformity of charge polarity of the electrically photosensitive particles dispersed in the liquid suspension. Such charge control agents are well known in the field of liquid electrographic developer compositions where they are employed for purposes substantially similar to that described herein. Thus, extensive discussion of these materials herein is deemed unnecessary. These materials are typically polymeric materials incorporated by admixture thereof into the liquid carrier vehicle of the suspension. In addition to, and possibly related to, the aforementioned enhancement of uniform charge polarity, it has been found that the charge control agents often provide more stable suspensions, i.e., suspensions which exhibit substantially less settling out of the dispersed photosensitive particles.

In addition to the foregoing charge control agent materials, various polymeric binder materials such as various natural, semi-synthetic or synthetic resins, may be dispersed or dissolved in the electrically insulating carrier to serve as a fixing material for the final photosensitive particle image formed on one of the spaced electrodes used in electrophoretic migration imaging systems. Here again, the use of such fixing addenda is conventional and well known in the closely related art of liquid electrographic developer compositions so that extended discussion thereof is unnecessary herein.

The process of the present invention will be described in more detail with reference to the accompanying drawing, FIG. 1, which illustrates a typical apparatus which employs the electrophoretic migration imaging process of the invention.

FIG. 1 shows a transparent electrode 1 supported by two rubber drive rollers 10 capable of imparting a translating motion to electrode 1 in the direction of the arrow. Electrode 1 may be composed of a layer of optically transparent material, such as glass or an electrically insulating, transparent polymeric support such as polyethylene terephthalate, covered with a thin, optically transparent, conductive layer such as tin oxide, indium oxide, nickel, and the like. Optionally, depending upon the particular type of electrophoretic migration imaging process desired, the surface of electrode 1 may bear a "dark charge exchange" material, such as a solid solution of an electrically insulating polymer and 2,4,7, trinitro-9-fluorenone as described by Groner in U.S. Pat. No. 3,976,485 issued Aug. 24, 1976.

Spaced opposite electrode 1 and in pressure contact therewith is a second electrode 5, an idler roller which serves as a counter electrode to electrode 1 for producing the electric field used in the electrophoretic migration imaging process. Typically, electrode 5 has on the surface thereof a thin, electrically insulating layer 6. Electrode 5 is connected to one side of the power source 15 by switch 7. The opposite side of the power source 15 is connected to electrode 1 so that as an exposure takes place, switch 7 is closed and an electric field is applied to the electrically photosensitive particulate material 4 which is positioned between electrodes 1 and 5. Typically electrically photosensitive particulate material 4 is dispersed in an electrically insulating carrier material such as described hereinabove.

The electrically photosensitive particulate material 4 may be positioned between electrodes 1 and 5 by applying material 4 to either or both of the surfaces of electrodes 1 and 5 prior to the imaging process or by injecting electrically photosensitive imaging material 4 between electrodes 1 and 5 during the electrophoretic migration imaging process.

As shown in FIG. 1, exposure of electrically photosensitive particulate material 4 takes place by use of an exposure system consisting of light source 8, an original image 11 to be reproduced, such as a photographic transparency, a lens system 12, and any necessary or desirable radiation filters 13, such as color filters, whereby electrically photosensitive material 4 is irradiated with a pattern of activating radiation corresponding to original image 11. Although the electrophoretic migration imaging system represented in FIG. 1 shows electrode 1 to be transparent to activating radiation from light source 8, it is possible to irradiate electrically photosensitive particulate material 4 in the nip 21 between electrodes 1 and 5 without either of electrodes 1 or 5 being transparent. In such a system, although not shown in FIG. 1, the exposure source 8 and lens system 12 is arranged so that image material 4 is exposed in the nip or gap 21 between electrodes 1 and 5.

As shown in FIG. 1, electrode 5 is a roller electrode having a conductive core 14 connected to power source 15. The core is in turn covered with a layer of insulating material 6, for example, baryta paper. Insulating material 6 serves to prevent or at least substantially reduce the capability of electrically photosensitive particulate material 4 to undergo a radiation induced charge alteration upon interaction with electrode 5. Hence, the term "blocking electrode" may be used, as is conventional in the art of electrophoretic migration imaging, to refer to electrode 5.

Although electrode 5 is shown as a roller electrode and electrode 1 is shown as essentially a translatable, flat plate electrode in FIG. 1, either or both of these electrodes may assume a variety of different shapes such as a web electrode, rotating drum electrode, plate electrode, and the like as is well known in the field of electrophoretic migration imaging. In general, during a typical electrophoretic migration imaging process wherein electrically photosensitive material 4 is dispersed in an electrically insulating, liquid carrier, electrodes 1 and 5 are spaced such that they are in pressure contact or very close to one another during the electrophoretic migration imaging process, e.g., less than 50 microns apart. However, where electrically photosensitive particulate material 4 is dispersed simply in an air gap between electrodes 1 and 5 or in a carrier such as a layer of heat-softenable or other liquefiable material coated as a separate layer on electrode 1 and/or 5, these electrodes may be spaced more than 50 microns apart during the imaging process.

The strength of the electric field imposed between electrodes 1 and 5 during the electrophoretic migration imaging process of the present invention may vary considerably; however, it has generally been found that optimum image density and resolution are obtained by increasing the field strength to as high a level as possible without causing electrical breakdown of the carrier medium in the electrode gap. For example, when electrically insulating liquids such as isoparaffinic hydrocarbons are used as the carrier in the imaging apparatus of FIG. 1, the applied voltage across electrodes 1 and 5 typically is within the range of from about 100 volts to about 4 kilovolts or higher.

As explained hereinabove, image formation occurs in electrophoretic migration imaging processes as the result of the combined action of activating radiation and electric field on the electrically photosensitive particulate material 4 disposed between electrodes 1 and 5 in the attached drawing. Typically, for best results, field application and exposure to activating radiation occur concurrently. However, as would be expected, by appropriate selection of various process parameters such as field strength, activating radiation intensity, incorporation of suitable light sensitive addenda in or together with the electrically photosensitive material of formula I used in the present invention, e.g., by incorporation of a persistent photoconductive material, and the like, it is possible to alter the timing of the exposure and field application events so that one may use sequential exposure and field application events rather than concurrent field application and exposure events.

When disposed between imaging electrodes 1 and 5 of FIG. 1, electrically photosensitive particulate material 4 exhibits an electrostatic charge polarity, either as a result of triboelectric interaction of the particles or as a result of the particles interacting with the carrier material in which they are dispersed, for example, an electrically insulating liquid, such as occurs in conventional liquid electrographic developing compositions composed of toner particles which acquire a charge upon being dispersed in an electrically insulating carrier liquid.

Image discrimination occurs in the electrophoretic migration imaging process of the present invention as a result of the combined application of electric field and activating radiation on the electrically photosensitive particulate material dispersed between electrodes 1 and 5 of the apparatus shown in FIG. 1. That is, in a typical imaging operation, upon application of an electric field between electrodes 1 and 5, the particles 4 of charge-bearing, electrically photosensitive material are attracted in the dark to either electrodes 1 or 5, depending upon which of these electrodes has a polarity opposite to that of the original charge polarity acquired by the electrically photosensitive particles. And, upon exposing particles 4 to activating electromagnetic radiation, it is theorized that there occurs neutralization or reversal of the charge polarity associated with either the exposed or unexposed particles. In typical electrophoretic migration imaging systems wherein electrode 1 bears a conductive surface, the exposed, electrically photosensitive particles 4, upon coming into electrical contact with such conductive surface, undergo an alteration (usually a reversal) of their original charge polarity as a result of the combined application of electric field and activating radiation. Alternatively, in the case wherein the surface of electrode 1 bears a dark charge exchange material as described by Groner in aforementioned U.S. Pat. No. 3,976,485, one obtains reversal of the charge polarity of the unexposed particles, while maintaining the original charge polarity of the exposed electrically photosensitive particles, as these particles come into electrical contact with the dark charge exchange surface of electrode 1. In any case, upon the application of electric field and activating radiation to electrically photosensitive particulate material 4 disposed between electrodes 1 and 5 of the apparatus shown in FIG. 1, one can effectively obtain image discrimination so that an image pattern is formed by the electrically photosensitive particles which corresponds to the original pattern of activating radiation. Typically, using the apparatus shown in FIG. 1, one obtains a visible image on the surface of electrode 1 and a complementary image pattern on the surface of electrode 5.

Subsequent to the application of the electric field and exposure to activating radiation, the images which are formed on the surface of electrodes 1 and/or 5 of the apparatus shown in FIG. 1 may be temporarily or permanently fixed to these electrodes or may be transferred to a final image receiving element. Fixing of the final particle image can be effected by various techniques, for example, by applying a resinous coating over the surface of the image bearing substrate. For example, if electrically photosensitive particles 4 are dispersed in a liquid carrier between electrodes 1 and 5, one may fix the image or images formed on the surface of electrodes 1 and/or 5 by incorporating a polymeric binder material in the carrier liquid. Many such binders (which are well known for use in liquid electrophotographic liquid developers) are known to acquire a change polarity upon being admixed in a carrier liquid and therefore will, themselves, electrophoretically migrate to the surface of one or the other of the electrodes. Alternatively, a coating of a resinous binder (which has been admixed in the carrier liquid), may be formed on the surfaces of electrodes 1 and/or 5 upon evaporation of the liquid carrier.

The electrically photosensitive colorant material used in the imaging process of the present invention may be used to form monochrome images, or the material may be admixed with other electrically photosensitive material of proper color and photosensitivity and used to form polychrome images. Said electrically photosensitive colorant material of the present invention also may be used as a sensitizer for other electrophotosensitive material in the formation of monochrome images. When admixed with other electrically photosensitive materials, selectively the photosensitive material of the present invention may act as a sensitizer and/or as an electrically photosensitive particle. As indicated, many of the electrically photosensitive colorant materials having formula I described herein have an especially useful yellow or orange hue and therefore are particularly suited for use in polychrome imaging processes which employ a mixture of two or more differently colored electrically photosensitive particles, e.g., a mixture of cyan particles which are principally sensitive to red light, magenta particles which are principally sensitive to green light, and yellow or orange particles containing the electrically photosensitive colorant materials described in the present invention which are principally sensitive to blue light. When such a mixture of multicolored electrically photosensitive particles is formed, for example, in an electrically insulating carrier liquid, this liquid mixture of particulate material exhibits a black coloration. Preferably, the specific cyan, magenta, and yellow particles selected for use in such a polychrome imaging process are chosen so that their spectral response curves do not appreciably overlap whereby color separation and subtractive multicolor image reproduction can be achieved.

The following examples illustrate the invention, the parts and percentages being by weight unless otherwise stated.

EXAMPLES

Image Evaluation Apparatus

An image evaluation apparatus was used in each of the succeeding examples to carry out the electrophoretic migration imaging process described herein. This apparatus was a device of the type illustrated in FIG. 1. In this apparatus, a translating NESA or NESATRON (trademarks of PPG for a conductive tin oxide treated glass or a conductive indium oxide sputtered glass, respectively) glass plate served as electrode 1 and was in pressure contact with a 10 centimeter diameter aluminum roller 14 covered with a thin insulating layer of poly(vinyl butyral)-TiO$_2$ coated paper 6 which served as electrode 5. NESA plate 1 was supported by two 2.8 cm. diameter rubber drive rollers 10 positioned beneath NESA plate 1 such that a 2.5 cm. opening, symmetric with the axis of the aluminum roller 14, existed to allow exposure of electrically photosensitive particles 4 to activating radiation. The original transparency 11 to be reproduced was taped to the back side of NESA plate 1. The exposing activating radiation was supplied from a light source 8 consisting of a Kodak Carousel projector and had a maximum intensity of 3500 footcandles at the NESA glass plate exposure plane. The voltage between the electrode 5 and NESA plate 1 was variable up to 10 kilovolts. However, most tests were made in the 0.5 to 2 kv range. NESA plate 1 was negative polarity in the case where electrically photosensitive particulate material 4 carried a positive electrostatic charge, and NESA plate 1 was positive in the case where electrically photosensitive electrostatically charged particles were negatively charged. The translational speed of NESA plate 1 was variable between about 1.25 cm. and about 30 cm. per second. In the following examples, image formation occurs on the surfaces of NESA glass plate 1 and electrode 5 after simultaneous application of light exposure and electric field to electrically photosensitive particulate material 4. In this image evaluation apparatus, each different type of material to be evaluated for use as electrically photosensitive particulate material 4 was admixed with a liquid carrier as described below to form a liquid imaging dispersion which was placed in nip 21 between the electrodes 1 and 5. If the material being evaluated for use as material 4 possessed a useful level of electrical photosensitivity, one obtained a negative-appearing image reproduction of original 11 on electrode 5 and a complementary image on electrode 1.

Imaging Dispersion Preparation

In the following examples a series of 46 different imaging dispersions were prepared to evaluate various types of materials for electrical photosensitivity. These dispersions were prepared by ball-milling the various materials to be tested for electrical photosensitivity at high concentration with a polymeric charge control agent and then diluting the resultant mixture with another polymer solution, such as by ultrasonic agitation. The exact ratios of the various materials used in the initial high concentration ball-mill concentrate and subsequent polymer solution are outlined below:

Ball-Mill Concentrate 1. 1 gram of material to be tested for electrical photosensitive properties,
2. 1 gram of polymeric charge control agent consisting of a copolymer of vinyl toluene, lauryl methacrylate, lithium methacrylate, and methacrylic acid, the monomeric weight percent ratio of vinyl toluene to lauryl methacrylate to lithium methacrylate to methacrylic acid being as follows: 56:40:3.6:0.4, respectively.
3. 110 grams of stainless steel balls having a diameter of about 3 mm., and
4. 12.2 grams of carrier liquid consisting of Solvesso 100 (purchased from the Exxon Corporation) or, alternatively, 10.7 grams of Isopar ® G (purchased from the Exxon Corporation).

Each of the ball-mill concentrates having the above-noted composition were ball-milled in a 125 milliliter glass jar at 115 revolutions per minute for at least one week. The ball-mill concentrates were then diluted by adding 35.8 grams of a 40% by weight solution of Piccotex 100 (a styrene-toluene copolymer purchased from the Pennsylvania Industrial Chemical Corporation) in Isopar ® G at a rate of 15 milliliters per minute through a hollow ultrasonic probe. During this dilution operation the temperature of the imaging dispersion thus being formed was maintained at approximately 20° C.

EXAMPLES 1–32

Table 2 hereinafter contains the results for 46 different materials evaluated for electrical photosensitivity properties for use in electrophoretic migration imaging. The first 32 materials evaluated in Table 2 correspond to the 32 materials set forth hereinbefore in Table 1. Each of these 32 different materials had a formula within structural formula I set forth hereinbefore and exhibited electrical photosensitivity when tested in a migration imaging process using the image evaluation apparatus as outlined above. However, the last 14 materials, i.e., materials 33–46 displayed no electrical photoresponse under these same evaluation conditions. However, material 33 does act as a chemical sensitizer as will be shown in other examples. Each of these last 13 materials tested had a structural formula outside the scope of formula I and therefore outside the scope of the present invention. However, the structural formula of the materials labeled 34–46 is quite similar to structural formula I, thereby indicating the surprising aspect of the present invention wherein it has been found that, for the particular class of known organic photoconductive materials tested herein, certain of these materials display useful levels of electrical photosensitivity or chemical sensitization suitable for electrophoretic migration imaging processes (i.e., see materials 1–33 of Table 2), whereas other closely related materials within this same general class of known organic photo-conductors do not possess useful levels of electrical photosensitivity in electrophoretic migration imaging (i.e., see materials 34–46 of Table 2). In Table 2, the speed of the NESA plate electrode 1 used in the above-described image evaluation apparatus is noted as well as various other evaluation parameters. Since materials 1–32 and 33 are identical to compounds 1–32 and 33 of Table 1, their structure is not presented in Table 2. Useful images are obtained with each of compounds 1–32 under the test conditions noted in Table 2.

Table 2

| Compound No. | Milling* Liquid | Particle Polarity | Exposure Filters (Neutral Density) | Nesa Glass Speed (cm/sec) | $\lambda_{max}$(nm) |
|---|---|---|---|---|---|
| 1 | S | + | 1.2 | 25 | 480 |
| 2 | S | + | 1.2 | 25 | 470 |

Table 2-continued

| Compound No. | Milling* Liquid | Particle Polarity | Exposure Filters (Neutral Density) | Nesa Glass Speed (cm/sec) | $\lambda_{max}$(nm) |
|---|---|---|---|---|---|
| 3 | I | + | 1.0 | 25 | 470 |
| 4 | S | + | None Used | 25 | 490 |
| 5 | S | + | None Used | 25 | 440 |
| 6 | S | + | None Used | 25 | 455 |
| 7 | S | + | None Used | 25 | 520 |
| 8 | I | + | None Used | 25 | 465 |
| 9 | S | + | None Used | 25 | |
| 10 | S | + | None Used | 25 | 425 |
| 11 | I | + | None Used | 25 | 415 |
| 12 | S | − | None Used | 25 | |
| 13 | S | + | None Used | 25 | 450 |
| 14 | S | + | None Used | 25 | 520 |
| 15 | S | − | None Used | 25 | 480 |
| 16 | S | + | None Used | 2.5 | |
| 17 | S | + | None Used | 2.5 | 430 |
| 18 | S | + | None Used | 2.5 | 450 |
| 19 | S | + | None Used | 25 | 460 |
| 20 | I | + | None Used | 25 | 430 |
| 21 | I | − | None Used | 25 | 460 |
| 22 | I | + | None Used | 25 | 465 |
| 23 | I | + | None Used | 25 | 460 |
| 24 | I | + | None Used | 25 | 450 |
| 25 | S | + | None Used | 2.5 | 450 |
| 26 | S | + | None Used | 2.5 | 450 |
| 27 | S | + | None Used | 25 | 480 |
| 28 | S | + | None Used | 25 | 520 |
| 29 | I | + | None Used | 25 | 430 |
| 30 | I | + | None Used | 25 | 460 |
| 31 | S | + | None Used | 25 | 470 |
| 32 | S | + | None Used | 25 | 480 |

The following compounds 33–48 failed to give an image under the evaluation conditions 33
34 Cl—⌬—CH=CH—⌬(NO₂)—NO₂
35 CH₃—⌬—CH=CH—⌬(NO₂)—NO₂
36 (naphthol OH)—CH=CH—⌬(NO₂)—NO₂
37 (C₂H₅)₂N—⌬—CH=CH—⌬(NO₂)—NO₂
38 ⌬(Cl)—CH=CH—⌬(NO₂)—NO₂
39 CH₃O—⌬—CH=CH—⌬(NO₂)—NO₂
40 (CH₃O)₃—⌬—CH=CH—⌬(NO₂)—NO₂
41 ⌬—CH=CH—⌬(NO₂)—NO₂
42 (C₆H₅)₂N—⌬—CH=CH—COOH
43 (C₂H₅)₂N—⌬—C(CN)=CH—CO₂C₂H₅
44 (C₂H₅)₂N—⌬—C(CN)=CH—CN
45 CH₃O, HO—⌬—C(CN)=CH—⌬—C(CN)=CH—⌬(OCH₃)—OH
46 (C₂H₅)₂N—⌬—C(CN)=CH—⌬—NO₂

*S - Solvesso 100
 I - Isopar® G

EXAMPLE 49

In this example, the use of the materials described by structural formula I herein in a polychrome electrophoretic migration imaging process was demonstrated. In this example, three separate cyan, magenta and yellow monochrome dispersions were prepared. Each such monochrome dispersion was prepared using the dispersion preparation technique outlined above. The electrically photosensitive material used as the photosensitive and colorant material in the cyan dispersion was Cyan Blue GTNF, Colour Index No. 74160, a beta form of copper phthalocyanine available from American Cyanamid. The electrically photosensitive material used as the photosensitive and colorant material in the magenta dispersion was Sandorin Brilliant Red 5BL, a quinacridine pigment similar or identical to Pigment Red 192 of the Colour Index and available from the Sandoz Corporation. The electrically photosensitive material used as the photosensitive and colorant material of the yellow dispersion was material 9 of Tables 1 and 2, i.e., 9,10-bis[4-(tolylamino)styryl]anthra-cene. After preparing each of the above-described monochrome dispersions, these three dispersions were admixed together in a volume ratio of cyan to magenta to yellow of 1:1:1. The resultant "trimix" dispersion was used to form multicolor electrophoretic migration images using the above-described image evaluation apparatus. In this multicolor imaging example, the intensity of the imagewise exposure on the plane of the NESA plate was 2000 footcandles and the translational speed of the NESA plate during the multicolor imaging operation was about 30 cm./sec. A Kodak Wratten 2B filter was included in the exposure beam of light. The voltage between electrode 5 and NESA plate 1 was maintained at 1 kilovolt during the imaging operation. As a result, it was found that a good quality three-color negative-to-positive print was formed on blocking layer 6 of electrode 5 and, also, a good positive-to-positive multicolor print was formed on the surface of NESA plate 1.

EXAMPLES 50–58

The following examples were carried out to demonstrate the capabilities of the electrophotosensitive materials of formula I as chemical sensitizers. Each dispersion in said examples was prepared according to a procedure which was substantially similar to the procedure used to prepare the dispersions of Examples 1–32. The apparatus used for formation of the images was substantially similar to that shown in FIG. 1 except that in some cases, a translating roller stationary glass plate electrode was used instead of the stationary roller electrode-translating glass plate embodiment of the apparatus.

EXAMPLE 50

Cyan, magenta, and yellow dispersions were prepared using Phthalo Blue Powder, Sandorin Brilliant Red 5BL, and compound 8 from Table 1 respectively. These dispersions were prepared according to a procedure substantially similar to that used to prepare the dispersions of Examples 1–32.

Small amounts of these three dispersions were placed adjacent to each other in the nip of a translating roller apparatus similar to that shown in FIG. 1 for imaging. The yellow dispersion was placed between the cyan and magenta dispersions. It was observed that the image on the roller blocking electrode showed an increase in print density for both the cyan and magenta prints in the regions of overlap with the yellow dispersion. This increase in density was especially noticeable for the cyan dispersion.

Portions of these three dispersions were mixed together in the ratio of 6/4/3, compound 8 (yellow)-/cyan/magenta and imaged as above. The test target consisted of adjacent Kodak Wratten 70 (red), 58 (green) and 47B (blue) filters superimposed with a Kodalith film containing clear letters on a dark background. The resulting negative-to-positive multicolor roller record had greater image density, especially for the cyan, than would have been predicted from the non-overlapped monochrome from the previous test.

The translational speed of the roller electrode was 20 cm/sec, for the above tests. The light intensity was 4000 foot candles, and the voltage on the NESA glass plate electrode was −1000 volts.

EXAMPLES 51–58

Eight separate yellow pigment dispersions were prepared using eight of the compounds from Table 1. Controlled magenta and cyan pigment dispersions were also prepared. The pigments for the two controls were of Sandorin Brilliant Red 5BL and Cyan Blue GTNF respectively. All dispersions were prepared according to Example 50.

The eight yellow pigment dispersions using compounds taken from Table 1 were used as sensitizers for the control magenta and cyan dispersions. Said yellow pigment dispersions were used as two different concentration levels. The levels were 1 and 5 part sensitizer dispersion to 50 parts of each of the control dispersion. This amounted to sensitizer concentrations of 0.04% and 0.18%. Other experimental conditions were as follows.

Light intensity: 2000 fc modified by a Kodak Wratten 2A filter and a 665 nm interference cutoff filter.

Electrode potential: −1500 volts on NESATRON glass plate.

Plate translational speed: 23 cm/sec for cyan and 15 cm/sec for magenta.

The test pattern used for testing these dispersions consisted of adjacent red, green, and blue filters (Kodak Wratten 29, 61, and 47 filters, respectively) each superimposed with a 0.3 ND step wedge.

To evaluate the speed increase due to the presence of a sensitizer, the light intensity needed to produce a mid-range print reflection density resulting from a color exposure complementary to the dispersion's color was compared to the intensity needed to produce the same reflection density with the control dispersion. For an example, the relative red light intensities for the same mid-range red, print reflection density were compared for the sensitized and unsensitized cyan dispersions and the speed increase calculated. This was also done for the magenta dispersion. The print density for the other color exposures corresponding to unwanted absorptions was measured in the same manner. The ratios of the speed increase for the primary to unwanted absorptions for the sensitized and unsensitized control were calculated and compared. These were identical within experimental error and, thus, it was concluded that the sensitization was primarily chemical rather than spectral in nature.

Table 3 lists the relative speed increases for the two sensitizer concentration levels relative to the unsensitized controls.

When one of these yellow sensitizer dispersions is used as one of the three components making up a tri-color dispersion, it functions not only as the primary colorant, but, also as a sensitizer for the magenta and cyan with no detrimental spectral shifts.

Table 3

| | Relative Speed Increase | | | |
|---|---|---|---|---|
| | Sensitized Magenta (Sensitizer Concentration) | | Sensitized Cyan (Sensitizer Concentration) | |
| Compound From Table 1 | 0.04% | 0.18% | 0.04% | 0.18% |
| 1 | 8 | 8 | 10 | 10 |
| 2 | 35 | 35 | 10 | 16 |
| 3 | 8 | 16 | 10 | 10 |
| 9 | 4 | 8 | 8 | 8 |
| 5 | 2 | 4 | 3 | 3 |
| 14 | 2 | 2 | 2 | 2 |
| 32b | 16 | 8 | 16 | 16 |
| 33 | 4 | 4 | 8 | 8 |

The invention has been described in detail with particular reference to certain preferred embodiments thereof, but it will be understood that variations and modifications can be effected within the spirit and scope of the invention.

We claim:

1. In an electrophoretic migration imaging process which comprises subjecting an electrically photosensitive colorant material positioned between at least two electrodes to an applied electric field and exposing said material to an image pattern of radiation to which the material is photosensitive, thereby obtaining image formation on at least one of said electrodes, the improvement which comprises using as at least a portion of said material an electrically photosensitive colorant having an absorption maximum greater than 410 nm. and having the formula:

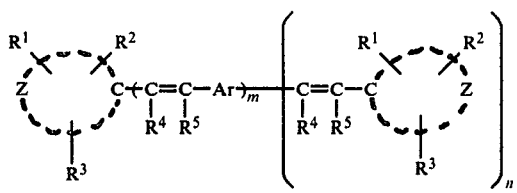

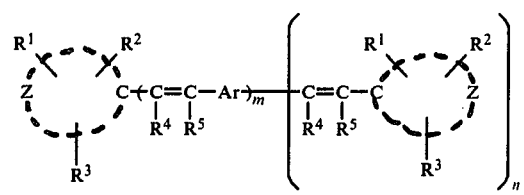

wherein
- n represents 0 or 1;
- m represents 1 or 2;
- Ar represents a substituted or unsubstituted, carbocyclic or heterocyclic aromatic ring having 6 to 20 ring atoms in the aromatic ring;
- Z represents the nonmetallic atoms necessary to complete a carbocyclic or heterocyclic aromatic ring having 5 to 14 ring atoms in the aromatic ring;
- each of $R^1$, $R^2$, $R^3$, $R^4$ and $R^5$, which may be the same or different, when taken alone, represent hydrogen, nitro, cyano, halogen, an alkoxy having 1 to 8 carbon atoms, a saturated heterocyclic amino having 5 to 8 ring atoms; a dialkylamino, diarylamino, dialkarylamino, or diaralkylamino wherein the alkyl group contained in such amino is a substituted or unsubstituted alkyl having 1 to 8 carbon atoms in the alkyl; a substituted or unsubstituted alkyl having 1 to 8 carbon atoms in the alkyl; a substituted or unsubstituted, carbocyclic or heterocyclic aromatic ring group having 5 to 14 carbon atoms in the aromatic ring, a carboxy ester having 1 to 4 carbon atoms, or an amide having the formula $$-CONR_2^6$$

wherein $R^6$ represents hydrogen or a substituted or unsubstituted aromatic group or a substituted or unsubstituted alkyl as defined above;
- each of $R^1$, $R^2$, and $R^3$, when taken together, represent together with Z, the atoms necessary to complete a fused, poly-nuclear carbocyclic or heterocyclic aromatic ring having 10 to 14 carbon atoms;
- said substituents for said substituted alkyl and aromatic ring groups contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group;
- with the proviso that when m represents 1 and n represents 0, Ar represents phenylene, and more than one of $R^4$, $R^5$ and the substituents on Ar represent either nitro or cyano, then at least one of $R^1$, $R^2$ or $R^3$ represents diarylamino or dialkylarylamino.

2. In an electrophoretic migration imaging process which comprises subjecting an electrically insulating carrier material positioned between at least two electrodes to an applied electric field and exposing said carrier material to an image pattern of radiation, said carrier material containing electrically photosensitive particles which comprise at least one colorant component photosensitive to said radiation, thereby obtaining image formation on at least one of said electrodes, the improvement which comprises using in at least a portion of said particles an electrically photosensitive colorant component having an absorption maximum greater than about 410 nm, and having the following formula:

wherein
- n represents 0 or 1;
- m represents 1 or 2;
- Ar represents a substituted or unsubstituted, carbocyclic or heterocyclic aromatic ring having 6 to 20 ring atoms in the aromatic ring;
- Z represents the nonmetallic atoms necessary to complete a carbocyclic or heterocyclic aromatic ring having 5 to 14 ring atoms in the aromatic ring;
- each of $R^1$, $R^2$, $R^3$, $R^4$ and $R^5$, which may be the same or different, when taken alone, represent hydrogen, nitro, cyano, halogen, an alkoxy having 1 to 8 carbon atoms, a saturated heterocyclic amino having 5 to 8 ring atoms; a dialkylamino, diarylamino, dialkarylamino, or diaralkylamino wherein the alkyl group contained in such amino is a substituted or unsubstituted alkyl having 1 to 8 carbon atoms in the alkyl; a substituted or unsubstituted alkyl having 1 to 8 carbon atoms in the alkyl; a substituted or unsubstituted, carbocyclic or heterocyclic aromatic ring group having 5 to 14 carbon atoms in the aromatic ring, a carboxy ester having 1 to 4 carbon atoms, or an amide having the formula $$-CONR_2^6$$

wherein $R^6$ represents hydrogen or a substituted or unsubstituted aromatic group or a substituted or unsubstituted alkyl as defined above;
- each of $R^1$, $R^2$, and $R^3$, when taken together, represent, together with Z, the atoms necessary to complete a fused, polynuclear carbocyclic or heterocyclic aromatic ring having 10 to 14 carbon atoms;
- said substituents for said substituted alkyl and aromatic ring groups contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group;
- with the proviso that when m represents 1 and n represents 0, Ar represents phenylene, and more than one of $R^4$, $R^5$ and the substituents on Ar represent either nitro or cyano, then at least one of $R^1$, $R^2$ or $R^3$ represents diarylamino or dialkylarylamino.

3. In an electrophoretic migration imaging process which comprises subjecting an electrically insulating carrier material positioned between at least two electrodes to an applied electric field and exposing said carrier material to an image pattern of radiation, said carrier material containing electrically photosensitive particles which comprise at least one colorant component photosensitive to said radiation, thereby obtaining image formation on at least one of said electrodes, the improvement which comprises using in at least a portion of said particles an electrically photosensitive colorant component having an absorption maximum greater than about 410 nm and having the following formula:

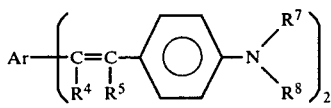

wherein
Ar represents a substituted or unsubstituted, carbocyclic or heterocyclic aromatic ring having 6 to 20 ring atoms in the aromatic ring;
each of $R^4$ and $R^5$, which may be the same or different, represents hydrogen or a cyano group; and
each of $R^7$ and $R^8$, which may be the same or different, when taken alone, represents a substituted or unsubstituted, acyclic lower alkyl having 1 to about 8 carbon atoms or a substituted or unsubstituted, carbocyclic aromatic ring having 6 to about 14 ring atoms in the aromatic ring and $R^7$ and $R^8$, when taken together, represent a pyrrolidinyl or a piperidino group and said substituents for said substituted acyclic lower alkyl and aromatic ring groups contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group.

4. In an electrophoretic migration imaging process which comprises subjecting an electrically insulating carrier material positioned between at least two electrodes to an applied electric field and exposing said carrier material to an image pattern of radiation, said carrier material containing electrically photosensitive particles which comprise at least one colorant component photosensitive to said radiation, thereby obtaining image formation on at least one of said electrodes, the improvement which comprises using in at least a portion of said particles an electrically photosensitive colorant composition having an absorption maximum greater than about 410 nm. and having the following formula:

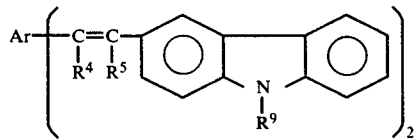

wherein
Ar represents a substituted or unsubstituted, carbocyclic or heterocyclic aromatic ring having 6 to 20 ring atoms in the aromatic ring;
each of $R^4$ and $R^5$, which may be the same or different, represents hydrogen or a cyano group; and
$R^9$ represents a substituted or unsubstituted, acyclic lower alkyl having 2 to about 8 carbon atoms or a substituted or unsubstituted, carbocyclic aromatic ring having 6 to about 14 ring atoms in the aromatic ring and said substituents for said substituted acyclic lower alkyl and aromatic ring contain from 1 to about 8 carbon atoms and are selected from the group consisting of alkoxy, aryloxy, amino, hydroxy, biphenyl, alkylamino, arylamino, nitro, cyano, halide, alkyl and an alkyl, aryl or amino substituted acyl group; ring group contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group;

5. In an electrophoretic migration imaging process which comprises subjecting an electrically insulating carrier material positioned between at least two electrodes to an applied electric field and exposing said carrier material to an image pattern of radiation, said carrier material containing electrically photosensitive particles which comprise at least one colorant component photosensitive to said radiation, thereby obtaining image formation on at least one of said electrodes, the improvement which comprises using in at least a portion of said particles an electrically photosensitive colorant component having an absorption maximum greater than about 410 nm. and having the following formula:

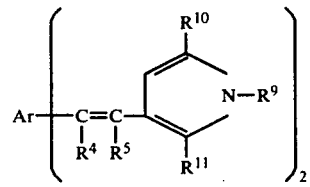

wherein
Ar represents a substituted or unsubstituted, carbocyclic or heterocyclic aromatic ring having 6 to 20 ring atoms in the aromatic ring;
each or $R^4$ and $R^5$, which may be the same or different, represents hydrogen or a cyano group; and
each of $R^9$, $R^{10}$ and $R^{11}$, which may be the same or different, represents a substituted or unsubstituted, acyclic lower alkyl having 2 to about 8 carbon atoms, or a substituted or unsubstituted, carbocyclic aromatic ring having 6 to about 14 ring atoms in the aromatic ring and said substituents for said substituted acyclic lower alkyl and aromatic ring contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group.

6. In an electrophoretic migration imaging process which comprises subjecting an imaging suspension positioned between at least two electrodes to an applied electric field and exposing said suspension to an image pattern of radiation, said suspension containing an electrically insulating carrier liquid and finely-divided, electrically photosensitive particles which comprise at least one colorant component photosensitive to said radiation, thereby obtaining image formation on at least one of said electrodes, the improvement which comprises using in at least a portion of said particles an electrically photosensitive colorant component having an absorption maximum greater than about 410 nm. and having the following formula:

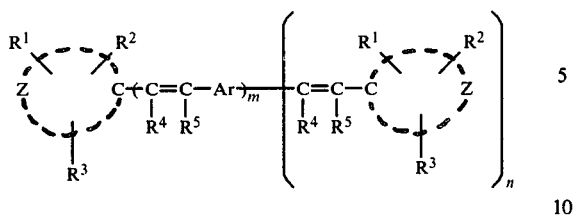

wherein
- n represents 0 or 1;
- m represents 1 or 2;
- Ar represents a substituted or unsubstituted, carbocyclic or heterocyclic aromatic ring having 6 to 20 ring atoms in the aromatic ring;
- Z represents the nonmetallic atoms necessary to complete a carbocyclic or heterocyclic aromatic ring having 5 to 14 ring atoms in the aromatic ring;
- each of $R^1$, $R^2$, $R^3$, $R^4$ and $R^5$, which may be the same or different, when taken alone, represent hydrogen, nitro, cyano, halogen, an alkoxy having 1 to 8 carbon atoms, a saturated heterocyclic amino having 5 to 8 ring atoms; a dialkylamino, diarylamino, dialkarylamino, or diaralkylamino wherein the alkyl group contained in such amino is a substituted or unsubstituted alkyl having 1 to 8 carbon atoms in the alkyl; a substituted or unsubstituted alkyl having 1 to 8 carbon atoms in the alkyl; a substituted or unsubstituted, carbocyclic or heterocyclic aromatic ring group having 5 to 14 carbon atoms in the aromatic ring, a carboxy ester having 1 to 4 carbon atoms, or an amide having the formula $-CONR_2^6$ wherein $R^6$ represents hydrogen or a substituted or unsubstituted aromatic group or a substituted or unsubstituted alkyl as defined above;
- each of $R^1$, $R^2$, and $R^3$, when taken together, represent, together with Z, the atoms necessary to complete a fused, polynuclear carbocyclic or heterocyclic aromatic ring having 10 to 14 carbon atoms;
- said substituents for said substituted alkyl and aromatic ring groups contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group;
- with the proviso that when m represents 1 and n represents 0, Ar represents phenylene, and more than one of $R^4$, $R^5$ and the substituents on Ar represent either nitro or cyano, then at least one of $R^1$, $R^2$ or $R^3$ represents diarylamino or dialkylarylamino.

7. In an electrophoretic migration imaging process as defined in claim 6, the improvement which comprises using in at least a portion of said particles an electrically photosensitive colorant component having any one of the following formulas:

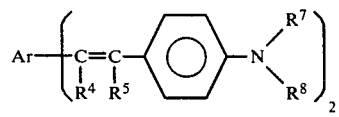

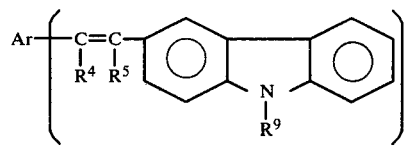

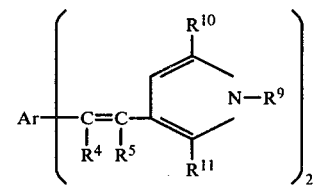

wherein
- Ar represents a substituted or unsubstituted, carbocyclic or heterocyclic aromatic ring having 6 to 20 ring atoms in the aromatic ring;
- each of $R^4$ and $R^5$, which may be the same or different, represents hydrogen or a cyano group; and
- each of $R^7$, $R^8$, $R^9$, $R^{10}$ and $R^{11}$, when taken alone, represents a substituted or unsubstituted, acyclic lower alkyl having 1 to about 8 carbon atoms or a substituted or unsubstituted, carbocyclic aromatic ring having 6 to 14 ring atoms in the aromatic ring group and, $R^7$ and $R^8$, when taken together, represent a pyrrolidinyl or piperidino group and said substituents for said substituted acyclic lower alkyl and aromatic ring groups contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group.

8. In an electrophoretic migration imaging process as defined in claim 6, the improvement which comprises using in at least a portion of said particles an electrically photosensitive colorant component having the formula:

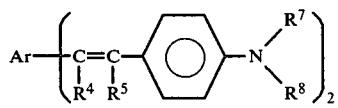

wherein
- Ar represents a substituted or unsubstituted, carbocyclic or heterocyclic aromatic ring having 6 to 20 ring atoms in the aromatic ring;
- each of $R^4$ and $R^5$, which may be the same or different, represents hydrogen or a cyano group; and
- each of $R^7$ and $R^8$, when taken alone, represents a substituted or unsubstituted, acyclic lower alkyl having 1 to about 8 carbon atoms or a substituted or unsubstituted, carbocyclic aromatic ring having 6 to about 14 ring atoms in the aromatic ring and $R^7$ and $R^8$, when taken together, represent a pyrrolidinyl or a piperidino group and said substituents for said substituted acyclic lower alkyl and aromatic ring groups contain from 1 to about 8 carbon atoms and are selected from the group consisting of alkoxy, aryloxy, amino, hydroxy, biphenyl, alkylamino, arylamino nitro, cyano, halogen, alkyl and an alkyl, aryl or amino substituted acyl group.

9. In a multicolor electrophoretic migration imaging process which comprises subjecting an imaging suspension positioned between at least two electrodes to an applied electric field and exposing said suspension to an image pattern of activating radiation, said suspension containing an electrically insulating carrier liquid and a mixture of at least two differently colored, finely-divided, electrically photosensitive particles, particles of one color being photosensitive to a different spectral range of said radiation than particles of a different color, at least some of said particles comprising at least one colorant component photosensitive to some portion of said radiation, thereby obtaining formation of a multicolor image on at least one of said electrodes, the improvement which comprises using in at least a portion of said particles an electrically photosensitive colorant component having an absorption maximum greater than about 410 nm. and having the following formula:

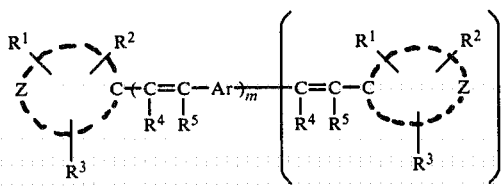

wherein
n represents 0 or 1;
m represents 1 or 2;
Ar represents a substituted or unsubstituted, carbocyclic or heterocyclic aromatic ring having 6 to 20 ring atoms in the aromatic ring;
Z represents the nonmetallic atoms necessary to complete a carbocyclic or heterocyclic aromatic ring having 5 to 14 ring atoms in the aromatic ring;
each of $R^1$, $R^2$, $R^3$, $R^4$ and $R^5$, which may be the same or different, when taken alone, represent hydrogen, nitro, cyano, halogen, an alkoxy having 1 to 8 carbon atoms, a saturated heterocyclic amino having 5 to 8 ring atoms; a dialkylamino, diarylamino, dialkarylamino, or diaralkylamino wherein the alkyl group contained in such amino is a substituted or unsubstituted alkyl having 1 to 8 carbon atoms in the alkyl; a substituted or unsubstituted alkyl having 1 to 8 carbon atoms in the alkyl; a substituted or unsubstituted, carbocyclic or heterocyclic aromatic ring having 5 to 14 carbon atoms in the aromatic ring, a carboxy ester having 1 to 4 carbon atoms, or an amide having the formula $-CONR_2^6$ wherein $R^6$ represents hydrogen or a substituted or unsubstituted aromatic group or a substituted or unsubstituted alkyl as defined above;
each of $R^1$, $R^2$, and $R^3$, when taken together, represent, together with Z, the atoms necessary to complete a fused, polynuclear carbocyclic or heterocyclic aromatic ring having 10 to 14 carbon atoms; said substituents for said substituted alkyl and aromatic ring groups contain from 1 to about 8 carbon atoms and are selected from the group consisting of alkoxy, aryloxy, amino, hydroxy, biphenyl, alkylamino, arylamino, nitro, cyano, halogen, alkyl and an alkyl, aryl or amino substituted acyl group;
with the proviso that when m represents 1 and n represents 0, Ar represents phenylene, and more than one of $R^4$, $R^5$ and the substituents on Ar represent either nitro or cyano, then at least one of $R^1$, $R^2$ or $R^3$ represents diarylamino or dialkylarylamino.

10. An electrophoretic migration imaging dispersion comprising a polymeric charge control agent, an electrically insulating carrier material and an electrically photosensitive colorant material
characterized in that at least a portion of said electrophotosensitive material comprises a colorant having an absorption maximum greater than 410 nm. and the formula:

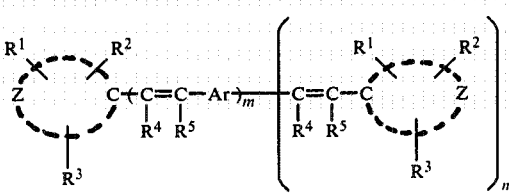

wherein
n represents 0 or 1;
m represents 1 or 2;
Ar represents a substituted or unsubstituted, carbocyclic or heterocyclic aromatic ring having 6 to 20 ring atoms in the aromatic ring;
Z represents the nonmetallic atoms necessary to complete a carbocyclic or heterocyclic aromatic ring having 5 to 14 ring atoms in the aromatic ring;
each of $R^1$, $R^2$, $R^3$, $R^4$ and $R^5$, which may be the same or different, when taken alone, represent hydrogen, nitro, cyano, halide, an alkoxy having 1 to 8 carbon atoms, a saturated heterocyclic amino having 5 to 8 ring atoms; a dialkylamino, diarylamino, dialkarylamino, or diaralkylamino wherein the alkyl group contained in such amino is a substituted or unsubstituted alkyl having 1 to 8 carbon atoms in the alkyl; a substituted or unsubstituted alkyl having 1 to 8 carbon atoms in the alkyl; a substituted or unsubstituted, carbocyclic or heterocyclic aromatic ring group having 5 to 14 carbon atoms in the aromatic ring, a carboxy ester having 1 to 4 carbon atoms, or an amide having the formula $-CONR_2^6$ wherein $R^6$ represents hydrogen or a substituted or unsubstituted aromatic group or a substituted or unsubstituted alkyl as defined above;
each of $R^1$, $R^2$, and $R^3$, when taken together, represent together with Z, the atoms necessary to complete a fused, polynuclear carbocyclic or heterocyclic aromatic ring, having 10 to 14 carbon atoms;
said substituents for said substituted alkyl and aromatic ring groups contain from 1 to about 8 carbon atoms and are selected from the group consisting of alkoxy, aryloxy, amino, hydroxy, biphenyl, alkylamino, arylamino, nitro, cyano, halide, alkyl and an alkyl, aryl or amino-substituted acyl group;
with the proviso that when m represents 1 and n represents 0, Ar represents phenylene, and more than one of $R^4$, $R^5$ and the substituents on Ar represent either nitro or cyano then at least one of $R^1$, $R^2$ or $R^3$ represents diarylamino or dialkylarylamino.

* * * * *

UNITED STATES PATENT AND TRADEMARK OFFICE
CERTIFICATE OF CORRECTION

PATENT NO. : 4,197,120

DATED : April 8, 1980

INVENTOR(S) : Hal E. Wright and Joseph Y. Kaukeinen

It is certified that error appears in the above-identified patent and that said Letters Patent are hereby corrected as shown below:

Column 31, line 42, "composition" should read ---component---.

Column 32, line 38, "each or" should read ---each of---.

Signed and Sealed this

Sixth Day of January 1981

[SEAL]

Attest:

SIDNEY A. DIAMOND

Attesting Officer

Commissioner of Patents and Trademarks